United States Patent [19]

Liang

[11] Patent Number: 4,889,898

[45] Date of Patent: Dec. 26, 1989

[54] THERMOPLASTIC POLYESTER BLENDS OF IMPROVED IMPACT RESISTANCE

[75] Inventor: Yeon F. Liang, Kohler, Wis.

[73] Assignee: Plastics Engineering Company, Sheboygan, Wis.

[21] Appl. No.: 308,170

[22] Filed: Feb. 8, 1989

[51] Int. Cl.[4] .............................................. C08L 69/00
[52] U.S. Cl. ...................................... 525/67; 525/133; 525/148
[58] Field of Search ................. 525/67, 133, 148, 285; 524/490

[56] References Cited

U.S. PATENT DOCUMENTS 4,792,477 12/1988 Ochiumi ............................. 428/216

FOREIGN PATENT DOCUMENTS 3234174 3/1984 Fed. Rep. of Germany .

Primary Examiner—Theodore E. Pertilla
Attorney, Agent, or Firm—Quarles & Brady

[57] ABSTRACT

A polymer blend of superior impact resistance comprises an intimate blend of a polyester resin, a polycarbonate resin and an acid-modified polyolefin. The preferred acid-modified polyolefin is a polyethylene wax which has been modified with maleic acid anhydride.

2 Claims, No Drawings

THERMOPLASTIC POLYESTER BLENDS OF IMPROVED IMPACT RESISTANCE

FIELD OF THE INVENTION

The present invention relates to polymer blends. More particularly, it relates to polymer blends of a thermoplastic polyester, a polycarbonate and an acid-modified polyolefin having improved impact resistance.

BACKGROUND OF THE INVENTION

In the past, it has been suggested that the impact resistances of blends of thermoplastic polymers and aromatic polycarbonates could be improved by adding a minor amount of a block co-polymer resin. In addition, the use of an acid-modified polyolefin has been suggested to improve the properties of hot melt adhesives. However, the use of an acid-modified polyolefin to increase the impact resistance of thermoplastic polyester/polycarbonate blends has not been suggested.

It has now been discovered that the addition of a minor amount of an acid-modified polyolefin can produce an unexpected increase in the impact resistance of thermoplastic polyester/polycarbonate blends.

SUMMARY OF THE INVENTION

It is the primary object of the present invention to disclose novel blends of thermoplastic polyesters, polycarbonates and acid-modified polyolefins which have superior impact resistance and other properties.

The compositions of the present invention broadly comprise blends of about 5 to about 95 parts by weight of a thermoplastic polyester, such as a polyalkylene terepthalate (PAT) resin; about 5 to about 95 parts by weight of a polycarbonate resin (PC); and a lesser impact resistance increasing amount of about 1 to about 20 parts by weight of an acid-modified polyolefin. The acid-modified polyolefin which has been found to be especially useful is a polyethylene wax which has been modified with maleic acid anhydride, and which has a molecular weight of approximately 8000.

DESCRIPTION OF THE PREFERRED EMBODIMENT

The preferred polymer blends of the present invention preferably contain about 10 to about 90 parts by weight of the polyester, about 10 parts to about 90 parts by weight of the polycarbonate and about 1 parts to about 20 parts by weight of the maleic anhydride modified polyethylene wax.

The impact resistance increasing acid-modified polyolefins used in the blends of the present invention are made by grafting a polyolefin, such as polyethylene, with an unsaturated dicarboxylic acid, such as maleic, citraconic, aconitic, itaconic, citric and fumaric acid or an acid anhydride. Especially preferred is the commercially available Epolene C-16 which is available from Eastman Chemical Company of Kingsport, Tenn. Epolene C-16 can be made by reacting a low density polyethylene having a molecular weight of approximately 7000 and a density of about 0.907 with maleic anhydride as described in Example 1 of U.S. Pat. No. 3,484,403.

The preferred polyesters are polyalkylene terepthalates which have a generally crystalline structure, a melting point over about 120° C., and which are thermoplastic as opposed to thermosetting. Representative polyesters are poly(ethylene terephthalate), poly(propylene terephthalate), and poly(butylene terephthalate). Stable polyblends of two or more of the polyesters, such as blends of poly(1,4-butylene terephthalate) and poly(ethylene terephthalate) also can be used. These polyesters generally have an intrinsic viscosity of at least about 0.4 dl/gram and preferably at least about 0.6 dl/gram as measured in 60:40 phenol/tetrachloroethane mixture at 30° C. in a concentration of 0.5% by weight.

Commercially available poly(alkylene terephthalates) are available from General Electric under the tradename VALOX ® thermoplastic polyesters. Other commercial polymers include CELANEX ® from Celanese, TENITE ® from Eastman Kodak, and VITUF ® from Goodyear Chemical.

The preferred polycarbonate resins for use in the blends of the present invention have the following general formulae:

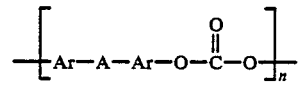

and

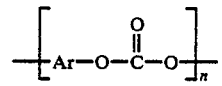

wherein Ar is selected from the group consisting of phenylene and alkyl, alkoxyl, halogena and nitro-substituted phenylene; A is selected from the group consisting of carbon-to-carbon bonds, alkylidene, cycloalkylidene, alkylene, cycloalkylene, azo, imino, sulfur, oxygen, sulfoxide and sulfone, and n is at least two.

The polycarbonates may be prepared by known methods. In general, the reaction is carried out by dissolving a dihydroxy component in a base such as pyridine and bubbling phosgene into the stirred solution at the desired rate. Tertiary amines may be used to catalyze the reaction as well as to act as acid acceptors throughout the reaction. Since the reaction is normally exothermic, the rate of phosgene addition can be used to control the reaction temperature. The reactions generally utilize equimolar amounts of phosgene and dihydroxy reactants, however, the molar ratios can be varied dependent upon the reaction conditions.

In the preferred polycarbonate of the present invention Ar is p-phenylene and A is isopropylidene. This polycarbonate is prepared by reacting para, para'-isopropylidenediphenol with phosgene and is sold by General Electric Company under the trademark LEXAN ®, by Mobay under the trademark MERLON ® and by Dow Chemical under the trademark CALIBRE. This commercial polycarbonate typically has a molecular weight of around 18,000, and melt temperature of over 230° C. Other polycarbonates may be prepared by reacting other dihydroxy compounds, or mixtures of dihydroxy compounds, with phosgene. The dihydroxy compounds may include aliphatic dihydroxy compounds although for best high temperature properties aromatic rings are essential. The dihydroxy compounds may include within the structure diurethane linkages. Also, part of the structure may be replaced by siloxane linkage.

The proportions in which the polyester, the polycarbonate and the acid-modified polyolefin are employed in the blends is generally within the range of about 5 to about 95 percent by weight of the polyester and about 5 to about 95 percent of the polycarbonate with the remainder of the blend being the acid-modified polyolefin.

The polymer blends of the instant invention may be compounded further with other polymers, oils, fillers, reinforcements, antioxidants, stabilizers, fire retardants, antiblocking agents and other rubber and plastic compounding ingredients without departing from the scope of this invention.

Examples of various fillers that can be employed are in the 1971-72 Modern Plastics Encyclopedia, pages 240-247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quarts and silica fibers, ceramic fibers, metal fibers, natural organic fibers, and synthetic organic fibers. In some instances it may be advantageous to use coupling agents, such as various silanes, in the preparation of the reinforced blends.

The blends can be prepared in any convenient manner. For example, by bringing together the components in solid form and dry-blending using conventional means such as a barrel mixer, a tumble mixer, and the like. Alternatively, the components are brought together and fluxed in an appropriate mixing apparatus such as a Banbury type internal mixer, rubber mill twin screw compounder and the like. Preferably, the components are brought together and processed in an appropriate melt extruder from which the blend is extruded in the form of strands and the like which are then pelletized for injection molding purposes. Standard techniques and apparatus well-known in the art can be used for these purposes.

The polymer blends of the instant invention are prepared by blending the components until a uniform composition is obtained. The resulting compositions can be employed for any use typically performed by engineering thermoplastics, such as metal replacements and those areas where high performance is necessary.

To illustrate the instant invention, a number of illustrative examples are given. It is to be understood, however, that the examples are for the purpose of illustration only and the invention is not to be limited except by the claims.

EXAMPLES 1-5

The following examples illustrate the combination of a polyethylene terephthalate (PET), and polycarbonate (PC) and the improvement in impact strength over PET alone.

The various blends were prepared using a polyethylene terephthalate (PET) (Clearturf 7207 from Goodyear), and a polycarbonate (PC) (LEXAN 141, General Electric). The formulations are as follows:

| Parts by Wt. | Examples | | | | |
| --- | --- | --- | --- | --- | --- |
| | 1 | 2 | 3 | 4 | 5 |
| PET | 100 | — | 80 | 60 | 40 |
| PC | — | 100 | 20 | 40 | 60 |

All components were tumble mixed until a uniform composition was obtained. The blends were extruded at 230°-240° C. and pelletized. Test specimens were obtained by injection molding the dried pellets at barrel temperatures of 240°-250° C. and die temperature of 60° C. Physical testings were performed and the results followed:

| Properties | Examples | | | | |
| --- | --- | --- | --- | --- | --- |
| | 1 | 2 | 3 | 4 | 5 |
| Notched Izod Impact, ft-lb/in | 0.42 | 16.51 | 0.43 | 0.50 | 2.88 |
| Tensile Strength, psi | 7936 | 8535 | 7714 | 7905 | 8320 |
| Flexural Strength, psi | 16260 | 18202 | 15765 | 15864 | 17053 |

The above examples show that the notched Izod impact strength of PET is improved upon blending with PC. However, a substantial amount of PC is required to achieve a significant improvement (e.g. 60% PC in Example 5).

EXAMPLES 6-12

The following examples illustrate the effect of an acid-modified polyolefin on the impact strength of PET/PC blends. The acid-modified polyolefin used was EPOLENE C-16; it is a maleic anhydride modified polyethylene wax with a molecular weight of approximately 8000. The formulations of the various blends are given below:

| Parts by Wt. | 6 | 7 | 8 | 9 | 10 | 11 | 12 |
| --- | --- | --- | --- | --- | --- | --- | --- |
| PET | 100 | — | 80 | 80 | 80 | 60 | 40 |
| PC | — | 100 | 20 | 20 | 20 | 40 | 60 |
| EPOLENE C-16 | 5 | 5 | 2.5 | 5 | 10 | 5 | 5 |

The blends were extruded and molded in accordance with the procedure of Example 1. The properties are as follows:

| Properties | 6 | 7 | 8 | 9 | 10 | 11 | 12 |
| --- | --- | --- | --- | --- | --- | --- | --- |
| Notched Izod Impact ft-lb/in | 0.86 | 10.63 | 0.93 | 1.14 | 1.57 | 2.31 | 9.36 |
| Tensile Strength psi | 7200 | 6038 | 7290 | 7355 | 6262 | 6516 | 7323 |
| Flexural Strength psi | 13892 | 14507 | 14350 | 13948 | 11610 | 12622 | 14917 |

The addition of 5 parts of Epolene C-16 doubles the notched Izod impact strength of PET (Compare Example 6 vs. Example 1). However, Epolene C-16 has a detrimental effect on the impact strength of PC (Compare Example 7 vs. Example 2).

Surprisingly, in the case of PET/PC blends, the impact strengths are increased dramatically by the acid-modified polyolefin. For instance, the addition of only five parts of Epolene C-16 to the blend of PET/PC (40/60) results in a striking synergistic 225% improvement in impact strength (compare Example 12 and Example 5).

EXAMPLES 13–16

The following examples are formulations of polybutylene terephthalate (PBT) (Celanese 2000-2, Celanese) and Lexan 141 (PC). The formulations are shown below.

| Parts by Wt. | 13 | 14 | 15 | 16 |
|---|---|---|---|---|
| PBT | 100 | 70 | 50 | 30 |
| PC | 0 | 30 | 50 | 70 |

The blends were extruded and molded in accordance with the procedure of Example 1. The testing results are shown below.

| Properties | 13 | 14 | 15 | 16 |
|---|---|---|---|---|
| Notched Izod Impact, ft-lb/in | 0.43 | 0.53 | 1.59 | 2.63 |
| Tensile Strength, psi | 7764 | 7987 | 8381 | 8754 |
| Flexural Strength, psi | 17979 | 17092 | 16935 | 17657 |

EXAMPLES 17–20

The following examples demonstrate the effect of Epolene C-16 on the impact strength of the formulations of Examples 13 to 16. The new formulations are given below.

| Parts by Wt | Examples | | | |
|---|---|---|---|---|
| | 17 | 18 | 19 | 20 |
| PBT | 100 | 70 | 50 | 30 |
| PC | — | 30 | 50 | 70 |
| EPOLENE C-16 | 5 | 5 | 5 | 5 |

The blends were extruded and molded in accordance with the procedure of previous examples. The testing results are as follows:

| Properties | Examples | | | |
|---|---|---|---|---|
| | 17 | 18 | 19 | 20 |
| Notched Izod Impact, ft-lb/in | 0.98 | 1.14 | 2.41 | 3.24 |
| Tensile Strength, psi | 6839 | 7097 | 7581 | 7387 |
| Flexural Strength, psi | 15399 | 15167 | 16083 | 15244 |

As can be seen, the incorporation of Epolene C-16 also increases the impact strength of PBT/PC blends, although the magnitude of improvement is not as great as in the PET/PC blends.

It will be apparent to those skilled in the art that the foregoing examples have been for illustrative purposes and that a number of modifications and changes can be made without departing from the spirit and scope of the invention. Therefore, it is intended that the invention be limited only by the claims.

I claim:
1. A polymer blend of improved impact resistance comprising:
   (a) about 5 to about 95 parts by weight of a polyalkylene terephthalate resin;
   (b) about 5 to about 95 parts by weight of a polycarbonate;
   (c) about 1 to about 20 parts by weight of an acid-modified polyolefin prepared by reacting a low density polyethylene having a molecular weight of about 7000 and a density of about 0.907 with maleic anhydride.
2. In a polymer blend comprising about 5 to about 95 parts by weight of a polyalkylene terephthalate, about 5 to about 95 parts by weight of a polycarbonate and an impact resistance enhancing additive, the improvement in which the impact resistance enhancing additive is an acid-modified polyolefin prepared by reacting a low density polyethylene with maleic anhydride.

* * * * *